Aug. 12, 1952  L. F. MAYLE  2,607,000
MULTILANE TRAFFIC WARNING CIRCUIT
Filed Feb. 13, 1947  3 Sheets-Sheet 2
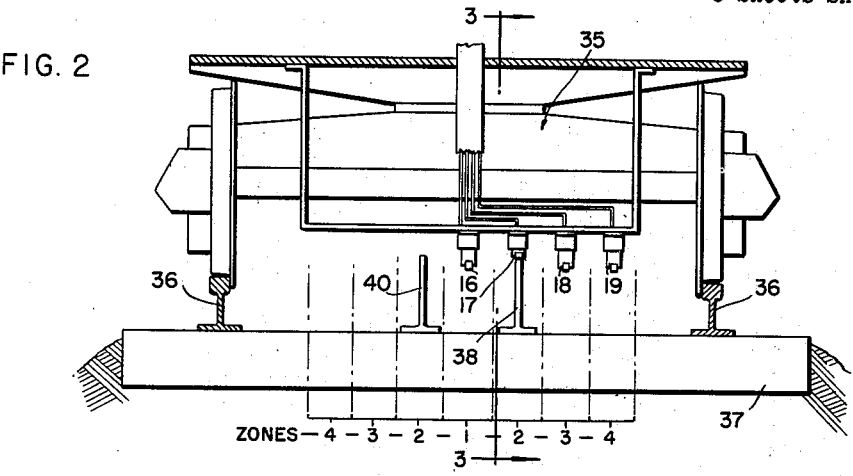
FIG. 2
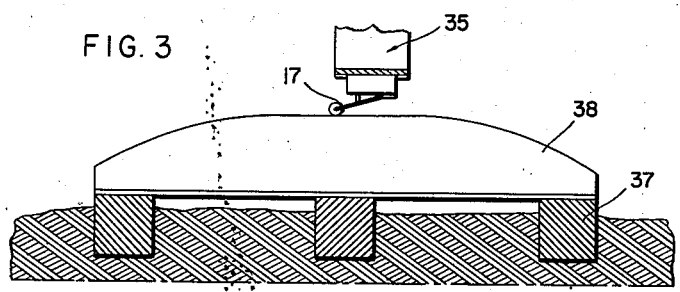
FIG. 3
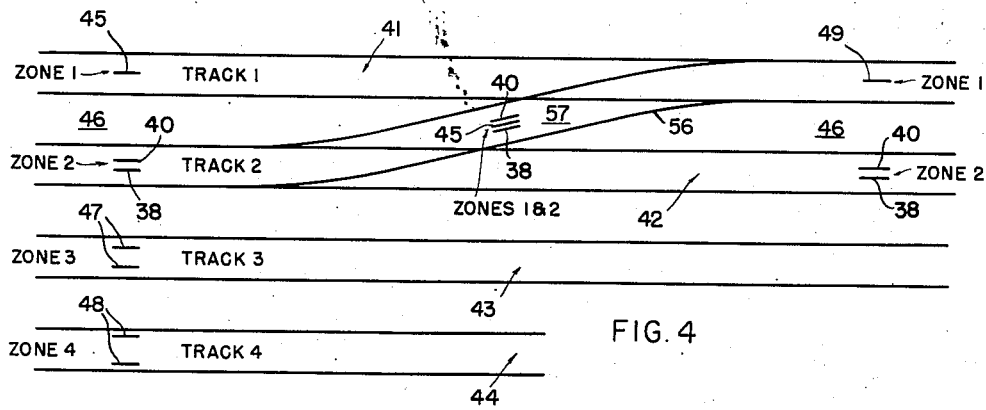
FIG. 4
INVENTOR
LOUIS F. MAYLE
BY 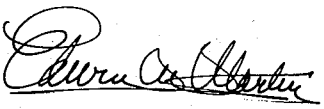
ATTORNEY Aug. 12, 1952      L. F. MAYLE      2,607,000
MULTILANE TRAFFIC WARNING CIRCUIT
Filed Feb. 13, 1947      3 Sheets-Sheet 3
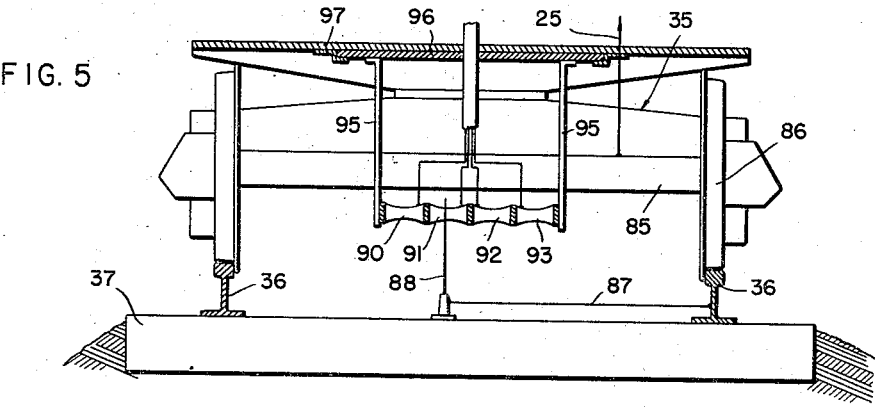
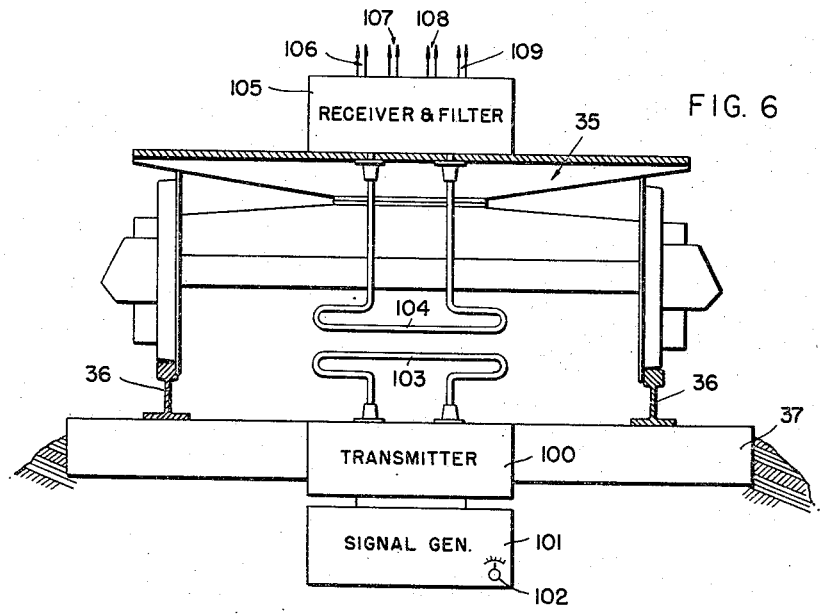
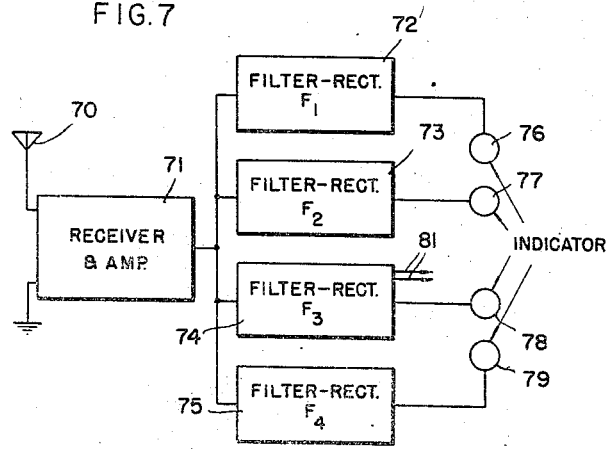
INVENTOR
LOUIS F. MAYLE
BY
ATTORNEY Patented Aug. 12, 1952

2,607,000

UNITED STATES PATENT OFFICE 2,607,000

MULTILANE TRAFFIC WARNING CIRCUIT

Louis F. Mayle, Fort Wayne, Ind., assignor, by mesne assignments, to Farnsworth Research Corporation, a corporation of Indiana Application February 13, 1947, Serial No. 728,252

3 Claims. (Cl. 246—30)

This invention relates generally to warning signaling systems and more particularly its pertains to a system for radiating between vehicles traveling on a multilane traffic artery warning signals which are indicative of the particular traffic lane such, for example, as a railroad track over which a vehicle is traveling.

In the copending application of John A. Curtis, Serial No. 650,069, filed February 25, 1946, now abandoned, there is described a vehicle warning system including a radio equipped vehicle which may radiate warning signals to other vehicles traveling along a right-of-way. The vehicle operator manually selects and controls the particular warning signal being radiated which is indicative of the traffic lane upon which the vehicle is traveling.

In conventional railroad operations, a train traveling over a multi-track right-of-way may be repeatedly switched from one track to another. According to the previous application above referred to, whenever the train changes its track, a different warning signal must be radiated. Accordingly, in the vehicle warning system shown in the above identified application, it depends upon the engineer whether the train will radiate the particular warning signal individual to the track over which the train is traveling at that instant. It is desirable, therefore, to select the warning signals by an automatically operated device, thereby to eliminate the possibility of error on the part of the engineer.

It is furthermore advantageous to provide means for checking periodically the selection of the warning signals while the train is in motion. Furthermore, it is desirable to radiate warning signals indicative of the one or more tracks which a train blocks while it is switched from one track to another.

It is the principal object of the present invention, therefore, to provide, in a warning signal system, for trains traveling over a multi-track right-of-way, a circuit arranged for automatically changing the radiated warning signal, when the train changes from one track to another, to indicate at any instant the track which the train occupies or the tracks which the train blocks while it is switched from one track to another.

A further object of the invention is to provide, in a warning signal system of the type referred to, a circuit for selectively rendering operative one or more warning signal sources while simultaneously rendering inoperative all previously selected signal sources.

In accordance with the present invention there is provided, in a warning signal system, a plurality of sources of warning signals. A locking relay is associated with each source of warning signals for rendering it effective. Means are provided for selectively energizing one of the locking relays, the means including a control relay coupled to each locking relay to render effective the selected signal source. Finally means are provided which are associated with each locking relay and which are controlled by those control relays not coupled to the locking relay associated with the means for rendering ineffective all but the selected signal source.

For a better understanding of the invention, together with other and further objects thereof, reference is made to the following description, taken in connection with the accompanying drawings, and its scope will be pointed out in the appended claims.

In the accompanying drawings:

Fig. 2 is an elevational view of a railroad undercarriage supported by a track and provided with normally open switches, and cooperating cams on the track for actuating a selected switch in accordance with the invention;

Fig. 3 is a sectional view taken on line 3—3 of Fig. 2 of one of the cams and its associated switch;

Fig. 4 illustrates four tracks and a switching track of a railroad right-of-way provided in accordance with the invention with cams for rendering operative a selected warning signal source;

Fig. 5 is an elevational view of the railroad undercarriage similar to Fig. 2 and illustrating a modified arrangement for energizing a selected warning signal source;

Fig. 6 is an elevational view of a railroad undercarriage similar to Fig. 5 and illustrating a transmitter on the track and an inductive pick-up loop on the undercarriage for receiving triggering signals to render operative a selected warning signal source; and Fig. 7 is a block diagram of a receiver arranged for cooperation with the transmitter of Fig. 1.

Figure 1:
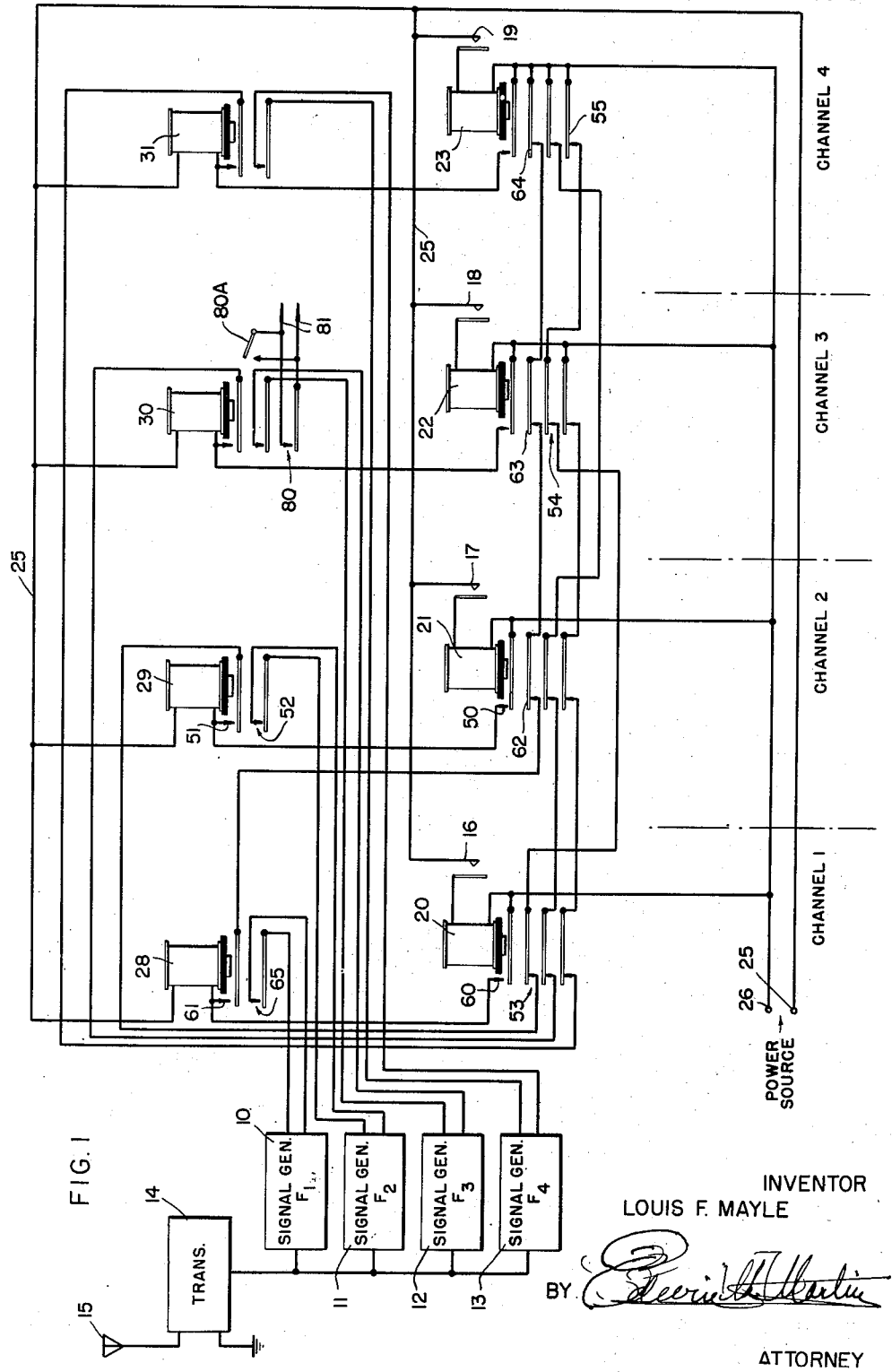
Fig. 1 is a circuit diagram, partly in block form, of a warning signal transmitter including a circuit for selectively actuating a warning signal source and embodying the invention.

Referring now to the drawings wherein the same reference numerals designate like components and particularly to Fig. 1, there is provided a warning signal transmitter adapted to be borne by a railway train or highway vehicle such, for example, as a locomotive, automobile, truck, bus or the like. The transmitter of Fig. 1 comprises a plurality of signal generators 10, 11, 12 and 13 adapted to generate warning signals which may be distinguished by their frequencies $f_1$, $f_2$, $f_3$ and $f_4$. Each warning signal $f_1$ to $f_4$ may be assigned to and is individual to a particular lane of traffic. The four signal generators 10 to 13 are accordingly adapted to develop warning signals indicative of four different traffic lanes. It is to be understood that a larger or smaller number of signal generators may be provided for developing warning signals indicative of any required number of traffic lanes.

Signal generators 10 to 13 are connected to transmitter 14 which is adapted to modulate a carrier wave in accordance with the warning signals developed by generators 10 to 13. A selected warning signal may be radiated into space by antenna 15 coupled to transmitter 14.

In accordance with the present invention one or more of the four signal generators 10 to 13 is automatically rendered effective to indicate the traffic lane or lanes on which the vehicle is traveling. To this end there are provided normally open trip switches 16, 17, 18 and 19 which are arranged for selectively connecting control relays 20, 21, 22 and 23 across leads 25 and 26 which are connected to a power source as indicated. Control relays 20 to 23 in turn control locking relays 28, 29, 30 and 31.

For each signal generator 10, 11, 12 and 13 there is provided a selector channel as shown in Fig. 1. Channel 1, for example, includes trip switch 16, control relay 20 and locking relay 28 arranged for energizing signal generator 10. Similarly, selector channel 2 includes trip switch 17, control relay 21 and locking relay 29 which are adapted for rendering effective signal generator 11, etc.

Referring now to Figs. 2 and 3, there are illustrated normally open trip switches 16 to 19 which are mounted on a conventional undercarriage 35 which supports a railroad car. Undercarriage 35 moves over rails 36, 36 mounted on a roadbed 37. It will be noted that the portion of roadbed 37 disposed between rails 36, 36 is divided into zone 1, zones 2, zones 3 and zones 4, zone 1 being provided in the center of the carriage. The remaining zones are disposed symmetrically about zone 1. The four trip switches 16 to 19 are each provided in one of the four zones to the right of the center of the carriage. Cam devices such as shown at 38 and 40 may be secured to roadbed 37 and arranged in one of the four zones which correspond to the four signal generators 10 to 13.

When the railroad car or train travels in a predetermined direction along a railroad track, cam 38 will close trip switch 17 thereby to energize control relay 21. When the same train travels over the same track in the opposite direction, trip switch 17 will now be closed by cam 40 because cams 38 and 40 are both disposed in zones 2, thereby to cooperate with switch 17.

Referring now to Fig. 4, there are illustrated four railroad tracks 41, 42, 43 and 44 which are designated, respectively, track 1, track 2, track 3 and track 4 to correspond to zones 1 to 4 and to channels 1 to 4. In accordance with the present invention track 41, for example, is provided with cams which may be identical with cam 38 in construction, or other suitable means for triggering switches 16 to 19 which are arranged as shown generally at 45 and 49 in zone 1. It will be noted that only one cam 45 or 49 is required in zone 1 which is the middle zone. Similarly, cams 38 and 40 with cam 38 (shown particularly in Fig. 4), are provided on track 42 as shown at 46, that is, in zones 2. Tracks 43 and 44, respectively, are provided with cams at 47 and 48 disposed in zones 3 and 4.

Thus, a train, which travels, for example, over track 42, has its switch 17 closed by either cam 38 or 40 (Fig. 2), depending upon the direction in which the train is traveling. When switch 17 is closed, control relay 21 is energized through the power source connected to leads 25 and 26. Control relay 21 as well as control relays 20, 22 and 23 are preferably arranged to operate instantaneously and to have a time delay on release which is sufficient to insure that their associated locking relay is energized before the control relay releases again. When control relay 21 is energized, a circuit through locking relay 29 is closed which may be traced from lead 25 through locking relay 29 and switch 50, which is normally open and which has been closed by control relay 21, back to power lead 26.

When locking relay 29 is energized, its switches 51 and 52, which are normally open, are closed. Switch 51 forms part of a holding circuit for locking relay 29. This holding circuit may be traced from power lead 25 through locking relay 29, switch 51 and thence through normally closed switches 53, 54 and 55 back to power lead 26. Switches 53, 54 and 55 are opened when control relays 20, 22 and 23 respectively are energized. Accordingly, when control relay 21 is released, locking relay 29 will remain energized. Its normally open switch 52 is connected to signal generator 11 which is accordingly rendered operative so that a warning signal of the frequency $f_2$ is radiated into space. This warning signal will indicate to any train that track 2 is now occupied by a train.

Let it be assumed that a train is switched from track 42 to track 41 over switching track 56. In accordance with the present invention switching track 56 is provided with three cams at 57, one of which 45 is provided in zone 1 and two 38 and 40, in zones 2. Accordingly, as the train moves in either direction over switching track 56, trip switch 16 is closed by cam 45 and switch 17 is closed simultaneously at 57 by either cams 38 or 40, depending upon the direction of travel of the train.

When switches 16 and 17 are closed, control relays 20 and 21 are both energized simultaneously the relay 29 being energized over power lead 26, through switch 16 to power lead 25. This will cause energization of locking relay 29 in the manner previously explained. At the same time switch 60 controlled by control relay 20 is also closed whereby locking relay 28 is energized through a circuit which may be traced from power lead 25 through locking relay 28, switch 60 and back to power lead 26. Locking relays 28 to 31 preferably have a time delay on release that is larger than that of control relays 20 to 23. Accordingly, switch 51 of locking relay 29 an switch 61 of locking relay 28 remain closed for an instant even after control relays 21 and 20 are de-energized. Locking relay 29 will then remain energized through the holding circuit previously explained. Locking relay 28 remains energized through a holding circuit including power lead 25, locking relay 28, switch 61 and normally closed switches 62, 63 and 64 controlled by control relays 21, 22 and 23, respectively, and power lead 26.

When locking relay 28 is energized, its switch 65 is closed which in turn will render operative signal generator 10 which develops a warning signal of the frequency $f_1$. In this manner it is feasible to render operative simultaneously two signal generators such as 10 and 11 for radiating warning signals indicative of two tracks which are blocked by the train.

After the train has been switched to track 41, it is no longer necessary to radiate warning signals indicative of track 42. Accordingly, there is provided a cam at 49 similarly disposed between the rails of the track 41 as cam 45 and spaced such a distance from switching track 56 that even the longest train will no longer occupy track 42 when the locomotive has reached the cam at 49. The cam at 49 in zone 1 will now close switch 16 to energize control relay 20 in the manner hereinabove described. Accordingly, switch 53 will be opened whereupon the holding circuit of locking relay 29 is interrupted to de-energize locking relay 29, thus rendering inoperative signal generator 11. Locking relay 28, on the other hand, will now be energized again in the manner previously explained to render effective signal generator 10.

It will be evident that the energization of any one of control relays 20 to 23 will render ineffective all previously selected locking relays and hence the previously selected signal generators and will simultaneously energize the locking relay associated with the selected control relay. When the train switches from one track to another, two control relays may be energized simultaneously to render effective the two associated signal generators. It is to be understood that if a train is switched over more than two tracks, more than two control relays may be energized simultaneously for rendering effective their associated signal generators. The warning signals are thus selected automatically and the signal selection is checked periodically by means, such as cams, which may be provided at suitable intervals in the appropriate zone or zones of each track.

Referring now to Fig. 7, there is illustrated a receiver which may be provided on a vehicle bearing the transmitter of Fig. 1 or on another vehicle traveling over the same multi-track right-of-way and which is adapted to receive the warning signals radiated into space by the transmitter of Fig. 1. The receiver comprises a receiving antenna 70 coupled to receiver and amplifier 71. There are further provided four filters and rectifiers 72, 73, 74 and 75 adapted for segregating the warning signals of the frequencies $f_1$, $f_2$, $f_3$ and $f_4$, respectively. Each filter 72 to 75 is connected to an indicator shown at 76, 77, 78 and 79 thereby to indicate the received warning signals. Indicators 76 to 79 may consist of a lamp which lights when the appropriate warning signals is received or of a bell which emits an audible warning signal.

Sometimes it may not be required or desirable for the engineer to receive signals indicative of tracks other than the one on which his train is traveling. Accordingly, it may be desirable to render only that filter or those filters 72 to 75 operative which are adapted to receive warning signals indicative of the track or tracks over which the train is traveling at that time. One such occasion is when the train is about to be switched from one track to another. The engineer then requires information regarding the condition of the track onto which his train is about to enter. To this end a normally open switch such as shown at 80 (Fig. 1), may be closed when, for example, locking relay 30 is energized. This switch is connected to leads 81 connected in turn to filter 74 (Fig. 7) to render the filter operative when switch 80 is closed. Similar switches could be provided which are controlled, respectively, by locking relays 28, 29 and 31 for rendering operative filters 72, 73 and 75. However, for some applications it may be necessary that the engineer receive warning signals indicative of all the tracks of a multi-track right-of-way. To render the filters selectively operative when the engineer requires as in the last mentioned case, a switch 80a in parallel with contacts 80, is provided. Switch 80a is manually operable and serves to render receiver filter 74 operable even when relay 30 is not actuated. Like manual contacts (not shown) may be provided in association with the other locking relays 28, 29 and 31, and adapted to cause receiving filters 72, 73 and 75 to become operative.

Referring now to Fig. 5, there is illustrated railway undercarriage 35 which is provided with alternative means for selectively closing switches 16 to 19. Power lead 25 may, for example, be connected through axle 85 and wheels 86 to rails 36. One of the rails 36 is connected through lead 87 with flexible metallic rod 88 which may be provided on roadbed 37. Flexible metallic rod 88 projects upwardly for providing selective engagement with zone of the metallic contact shoes 90, 91, 92 and 93 which are electrically insulated from each other. As illustrated in Fig. 5 metallic rod 88 engages contact shoe 91 which in turn may be connected through a lead with control relay 21. Thus, switch 17 is replaced by two contactors, one of which may be represented by wheels 86 while the other is represented by contact shoe 91.

Depending upon the position of metallic rod 88 between rails 36, one of the contact shoes 90 to 93 will be connected therewith, when the train moves over rod 88 thereby closing a circuit through the selected control relay.

Contact shoes 90 to 93 are mounted on undercarriage 35 by supporting arms 95 which are secured to turntable 96 rotatably mounted in bracket 97.

It will be observed that contact shoes 90 to 93 are not disposed in zones 1 to 4 as are switches 16 to 19. Instead they are mounted symmetrically about the center of undercarriage 35. Thus, when the train moves in a predetermined direction on a track, contact shoes 90 to 93 may be disposed as illustrated in Fig. 5. When the train moves in the opposite direction, contact shoes 90 to 93 may be rotated through 180 degrees by means of turntable 96 so that the metallic rod 88 on the track will again engage with the selected contact shoe such as 91. It is to be understood that each track will be provided with metallic rods such as shown at 88 and disposed in such a position as to engage with a particular one of the contact shoes 90 to 93 thereby to render operative one of the signal generators 10 to 13 indicative of the track over which the train is traveling.

Fig. 6 illustrates another modification of the means for selectively actuating one of the control relays 20 to 23. In this instance one of the signal generators 10 to 13 is selectively energized by inductive means. A fixed transmitter 100 is provided in roadbed 37 between rails 36. Transmitter 100 is operatively connected to signal generator 101 arranged to develop a triggering signal which serves for selectively actuating one of the control relays. A plurality of triggering signals may be provided, each of which is allocated to a separate track. The frequency of the triggering signal developed by signal generator 101 may be adjusted by control knob 102. A carrier wave may be modulated in accordance with the triggering signal developed by signal generator 101, or else the triggering signal may be amplified and directly radiated into space by loop antenna 103 coupled to transmitter 100. Loop antenna 103 is preferably arranged to radiate the triggering signal only between rails 36.

A receiving antenna or inductive loop 104 is provided on undercarriage 35 of the train which is responsive to the triggering signals radiated by transmitter 100. The induced signal voltage is amplified and filtered by receiver 105 coupled to inductive loop 104. Receiver 105 may include a filter for each triggering signal for segregating the triggering signals from each other. Leads 106, 107, 108 and 109 may be connected to the filters provided in receiver 105 and may be coupled individually to control relays 20 to 23 for selectively energizing one of the control relays. Thus, when one of the filters passes a triggering signal, the signal may energize directly the selected control relay. Alternatively, instead of providing filters in receiver 105 the demodulated triggering signal may be impressed upon vibrating reed relays arranged in series. Each of the relays may be responsive to one of the triggering signals and may, upon being energized, close one of the switches 16 to 19. Alternatively, control relays 20 to 23 may be replaced by the vibrating reed relays and their circuit may be closed through receiver 105.

It will be understood that a transmitter such as shown at 100 may be provided on each track at appropriate intervals. Signal generator 101 should be adjusted so that each transmitter radiates a triggering signal indicative of its associated track.

While there has been described what is at present considered the preferred embodiment of the invention, it will be obvious to those skilled in the art that various changes and modifications may be made therein without departing from the invention, and it is, therefore, aimed in the appended claims to cover all such changes and modifications as fall within the true spirit and scope of the invention.

Reference is made to the U. S. patent application of John A. Curtis, filed of even date herewith, Serial No. 728,366, now abandoned for Multi-Lane Traffic Warning Systems wherein the system shown herein is claimed.

What is claimed is:

1. In a warning signal system for radiating warning signals between vehicles traveling over a multi-track right-of-way including switching tracks for connecting several tracks, a plurality of sources of warning signals, a locking relay associated with each of said sources, a control relay coupled to each of said locking relays for actuating it to energize the associated signal source, means for selectively actuating one of said control relays, each of said locking relays having a time delay on release that is sufficient to hold an actuated locking relay for a predetermined instant after its associated control relay is de-energized, and a holding circuit for each of said locking relays for keeping an actuated locking relay energized and controlled by all of said control relays but the selected control relay, said holding circuit being arranged upon selection of another control relay to de-energize the previously selected source, whereby simultaneous selection of two of said control relays permits actuation of two locking relays and locking thereof to energize simultaneously two associated signal sources.

2. In a warning signal system for radiating warning signals between vehicles traveling over a multi-track right-of-way including switching tracks for connecting several tracks, a plurality of sources of warning signals, a locking relay associated with each of said sources, a control relay coupled to each of said locking relays for actuating it to energize the associated signal source, means for selectively actuating one of said control relays, said locking relays having a time delay on release that is sufficient to hold an actuated locking relay a predetermined instant after the selected control relay is released, and a normally closed holding circuit for each of said locking relays for keeping an actuated locking relay energized and controlled by all of said control relays but the selected control relay so that said holding circuit is opened upon selection of another control relay to de-energize the previously selected source, whereby simultaneous actuation of two of said control relays permits actuation of two locking relays and locking thereof to energize simultaneously two associated signal sources.

3. In a warning signal system for radiating warning signals between vehicles traveling over a multi-track right-of-way including switching tracks for connecting several tracks, a plurality of sources of warning signals, a locking relay associated with each of said sources, a control relay coupled to each of said locking relays for actuating it to energize the associated signal source, means for selectively actuating one of said control relays, each of said control relays being operative instantaneously and having a time delay on release sufficient to actuate its cooperating locking relay, each of said locking relays having a time delay on release that is larger than that of said control relays, and a normally closed holding circuit for each of said locking relays for keeping an actuated locking relay energized and controlled by all of said control relays but the selected control relay, said holding circuit being opened upon a selection of another control relay to de-energize the previously selected source, whereby simultaneous selection of two of said control relays permits actuation of two locking relays and locking thereof to energize simultaneously two associated signal sources.

LOUIS F. MAYLE.

REFERENCES CITED

The following references are of record in the file of this patent:

UNITED STATES PATENTS

| Number | Name | Date |
|---|---|---|
| 2,252,525 | Reid et al. | Aug. 12, 1941 |

FOREIGN PATENTS

| Number | Country | Date |
|---|---|---|
| 305,077 | Germany | Oct. 9, 1919 |
| 108,213 | Great Britain | Aug. 2, 1917 |